US009235009B2

United States Patent
Kato (10) Patent No.: US 9,235,009 B2
(45) Date of Patent: Jan. 12, 2016

(54) OPTICAL CONNECTOR AND METHOD OF PREVENTING PROTECTION TUBE FROM COMING OFF FROM OPTICAL CONNECTOR

(71) Applicant: FUJIKURA LTD., Koto-ku, Tokyo (JP)

(72) Inventor: Seiji Kato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/662,523

(22) Filed: Mar. 19, 2015

(65) Prior Publication Data

US 2015/0268422 A1 Sep. 24, 2015

(30) Foreign Application Priority Data

Mar. 20, 2014 (JP) ................................. 2014-058843

(51) Int. Cl.
*G02B 6/36* (2006.01)
*G02B 6/38* (2006.01)

(52) U.S. Cl.
CPC ................ *G02B 6/387* (2013.01); *G02B 6/389* (2013.01); *G02B 6/3821* (2013.01); *G02B 6/3855* (2013.01); *G02B 6/3862* (2013.01); *G02B 6/3887* (2013.01); *Y10T 29/49925* (2015.01)

(58) Field of Classification Search
CPC .. G02B 6/3821; G02B 6/3855; G02B 6/3862; G02B 6/3869; G02B 6/387; G02B 6/3887; G02B 6/389
See application file for complete search history.

(56) References Cited

U.S. PATENT DOCUMENTS

| | | | |
|---|---|---|---|
| 5,138,678 A | 8/1992 | Briggs et al. | |
| 7,234,875 B2 * | 6/2007 | Krowiak | G02B 6/3885 385/53 |
| 8,740,479 B2 * | 6/2014 | Shitama | G02B 6/255 385/95 |
| 8,814,444 B2 * | 8/2014 | Ishikawa | G02B 6/3825 385/60 |
| 2007/0098327 A1 * | 5/2007 | Krowiak | G02B 6/3885 385/53 |
| 2009/0285534 A1 * | 11/2009 | Ishikawa | G02B 6/3825 385/81 |
| 2012/0243832 A1 | 9/2012 | Tamekuni et al. | |
| 2013/0121653 A1 | 5/2013 | Shitama et al. | |
| 2015/0268422 A1 * | 9/2015 | Kato | G02B 6/3855 385/66 |

FOREIGN PATENT DOCUMENTS

| | | |
|---|---|---|
| JP | 57-132107 A | 8/1982 |
| JP | 63-199202 U | 12/1988 |
| JP | 05-224090 A | 9/1993 |

(Continued)

OTHER PUBLICATIONS

Notification of Reasons for Refusal for JP 2014-058843 dated Oct. 21, 2014.

(Continued)

*Primary Examiner* — Rhonda Peace
(74) *Attorney, Agent, or Firm* — Sughrue Mion, PLLC (57) ABSTRACT

An optical connector of an embodiment of the present invention includes a fixing member made up of two half sprit members engaged with each other, the fixing member applying external pressure, toward an optical fiber combining section of a spring push, to a protection tube which covers a stair part of an outer circumferential surface of the optical fiber combining section. The fixing member securely fixes the protection tube to the optical fiber combining section. As such, it is possible to provide a general-purpose optical connector having a high reliability that an optical fiber cord is unlikely to come off from the optical connector.

10 Claims, 6 Drawing Sheets

(56) References Cited

FOREIGN PATENT DOCUMENTS

| | | |
|---|---|---|
| JP | 2000-039538 A | 2/2000 |
| JP | 2000-065271 A | 3/2000 |
| JP | 2004-102072 A | 4/2004 |
| JP | 2006-030287 A | 2/2006 |
| JP | 2007-322646 A | 12/2007 |
| JP | 2008-122728 A | 5/2008 |
| JP | 2011-118348 A | 6/2011 |
| JP | 2012-145885 A | 8/2012 |

OTHER PUBLICATIONS

Decision to Grant a Patent for Japanese Application 2014-058843 dated Jan. 27, 2015.

* cited by examiner

OPTICAL CONNECTOR AND METHOD OF PREVENTING PROTECTION TUBE FROM COMING OFF FROM OPTICAL CONNECTOR

This Nonprovisional application claims priority under 35 U.S.C. §119(a) on Patent Application No. 2014-058843 filed in Japan on Mar. 20, 2014, the entire contents of which are hereby incorporated by reference.

TECHNICAL FIELD

The present invention relates to an optical connector. The present invention relates particularly to (i) an optical connector assembled at an end of a bare optical fiber protected by a protection tube and (ii) a method of preventing the protection tube from coming off from the optical connector.

BACKGROUND ART

As optical connectors known are a single-core optical fiber connector such as an SC-type optical connector defined by JIS C 5973, an F13-type multi-core optical fiber connector defined by JIS C 5982 (a so-called MPO connector), and like optical connectors. An optical connector has a basic structure in which (i) a connector housing houses an optical ferrule which fixes an end part of an optical fiber which is inserted into the optical ferrule, a coil spring which gives force to the optical ferrule, and a spring push which receives reactive force of the coil spring, and (ii) a rubber boot is combined with a back part of the spring push so as to protect a vicinity of a connection part of the optical fiber. When the optical connector is connected to an adaptor on a first side of the adaptor, the optical ferrule faces an optical ferrule of another optical connector connected to the adaptor on a second side opposite to the first side. This allows the optical fiber to be optically connected to another optical fiber.

Patent Literatures 1 and 2 disclose examples of the optical connector having the basic structure.

Patent Literature 1 discloses a connector provided with a stopper which serves as locking means which prevents a ferrule from coming off. The connector is configured so that the stopper is combined with an optical fiber cord by further causing a crimping section to crimp part of an outer circumferential surface of the stopper which part is covered with a tension-resistance member of an optical fiber cord.

Patent Literature 2 discloses an optical connector configured so that a loose tube into which a bare fiber is being inserted is provided inside of a cylindrical stop ring that partially constitutes a connector housing. A metallic crimping pipe is provided outside of the loose tube. The metallic crimping pipe is uniformly reduced in diameter toward the loose tube, so that the bare fiber is fixed in a substantial center of the loose tube.

CITATION LIST

Patent Literatures

Patent Literature 1
Japanese Patent Application Publication Tokukai No. 2004-102072 (Publication Date: Apr. 2, 2004)
Patent Literature 2
Japanese Patent Application Publication Tokukai No. 2006-30287 (Publication Date: Feb. 2, 2006)

SUMMARY OF INVENTION

Technical Problem

However, according to the configuration of Patent Literature 1, a crimping section crimps a fibrous tension-resistance member. This probably fails to securely fix an optical fiber cord to an optical connector (specifically, a stopper). For example, in a case where a back part of the optical connector is pulled so that tension is applied to the optical fiber cord, the tension-resistance member comes off from the crimping section. This probably, for example, cuts a bare optical fiber in the optical connector.

An aspect of Patent Literature 2 where a loose tube into which a bare fiber is being inserted is crimped is applicable to a single-core optical fiber connector. On the other hand, in a case where the aspect is applied to the above-described multi-core optical fiber connector, for example, optical fibers will come into contact with each other in a crimped part, so that the optical fiber(s) is/are broken.

Each of the crimping section of Patent Literature 1 and a crimping pipe of Patent Literature 2 is a single tubular member. Therefore, a bare fiber should be inserted into the crimping section or the crimping pipe before being inserted into and fixed to an optical ferrule. The crimping section or the crimping pipe into which the bare fiber has been already inserted sometimes disturbs an operation of inserting and fixing the bare fiber which does not have any sufficient surplus length.

The present invention was made in view of the problems, and an object of the present invention is to provide (i) a general-purpose optical connector applicable to both a signal-core optical fiber connector and a multi-core optical fiber connector and having a high reliability that a bare optical fiber is unlikely to come off from the optical connector, and (ii) a method of preventing a protection tube from coming off from the optical connector.

Solution to Problem

In order to attain the object, an optical connector of the present invention is configured to be an optical connector assembled at an end of a bare optical fiber protected by a protection tube, including: a cylindrical structure (i) which is provided on a back end side of a housing body of the optical connector which housing body houses a ferrule, (ii) into which the bare optical fiber which extends from the ferrule is inserted, and (iii) which has an outer circumferential surface to which the protection tube is fixed; and a fixing member which is combined with the cylindrical structure so that the protection tube is sandwiched between the outer circumferential surface of the cylindrical structure and an inner wall surface of the fixing member, one of the outer circumferential surface of the cylindrical structure and the inner wall surface of the fixing member having a protrusion section which applies pressure to the protection tube to deform the protection tube so that the protection tube is fixed to the cylindrical structure, whereas the other of the outer circumferential surface of the cylindrical structure and the inner wall surface of the fixing member having a stair part in a vicinity of a back side of the protrusion section, the stair part having a back portion having only an inclined surface which inclines in a direction opposite to a direction in which the protrusion section protrudes, and the protection tube which is in contact with the stair part being bent in the direction opposite to the direction in which the protrusion section protrudes so as to be stepped, so that resistance against pulling out of the protection tube is caused.

Advantageous Effects of Invention

An optical connector of the present invention is a general-purpose optical connector applicable to both a signal-core optical fiber connector and a multi-core optical fiber connector. Further, an end part of a protection tube provided on an outer circumferential surface of a cylindrical structure is bent between the outer circumferential surface of the cylindrical structure and a surface of a fixing member so that friction resistance between the outer circumferential surface and the surface of the fixing member facing the protection tube and having a protrusion section and a concave part. Therefore, the present invention brings about an effect of providing an optical connector which (i) securely fixes an optical fiber cord to a spring push and (ii) has a high reliability.

BRIEF DESCRIPTION OF DRAWINGS (a) of FIG. 1 is a planar diagram of an optical connector of an embodiment of the present invention. (b) of FIG. 1 is a cross-sectional diagram of (a) of FIG. 1.

DESCRIPTION OF EMBODIMENTS

The following description will discuss an embodiment of the present invention with reference to FIGS. 1 through 5.

Figure 1:
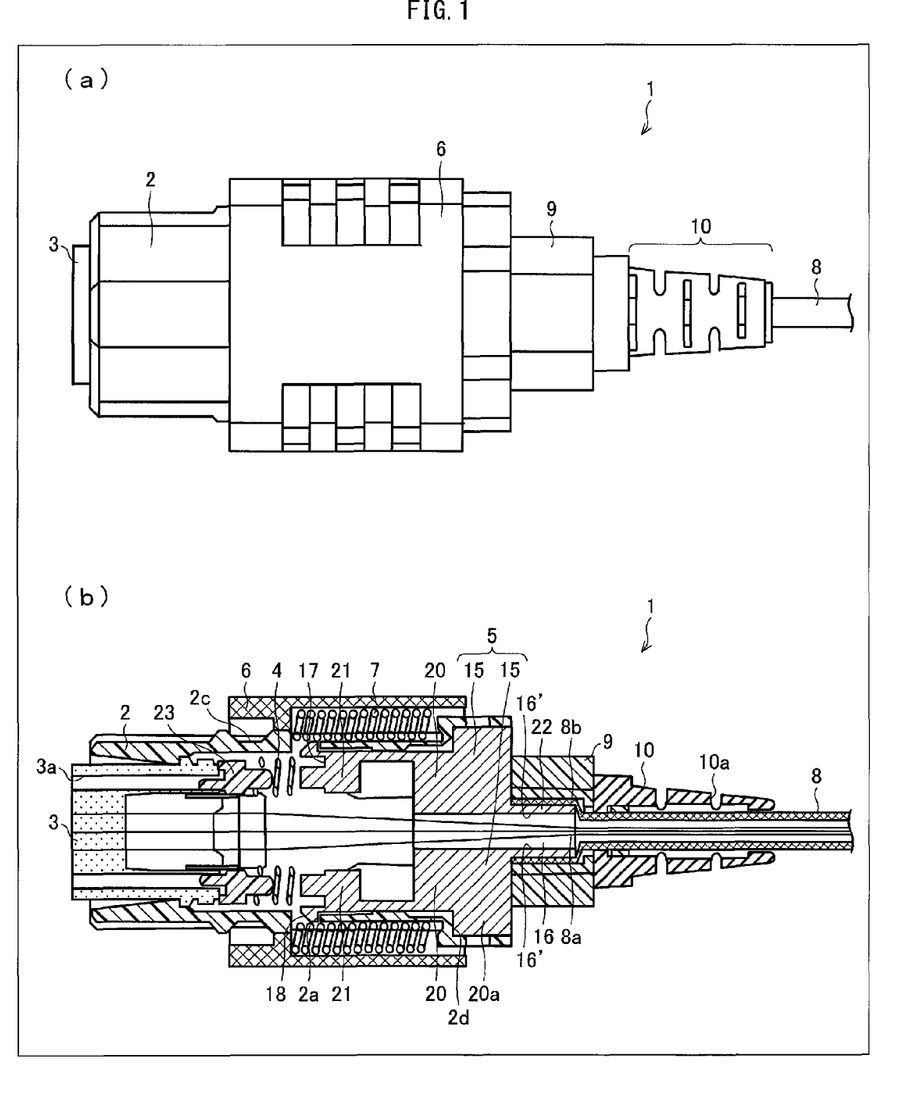
Figure 2:
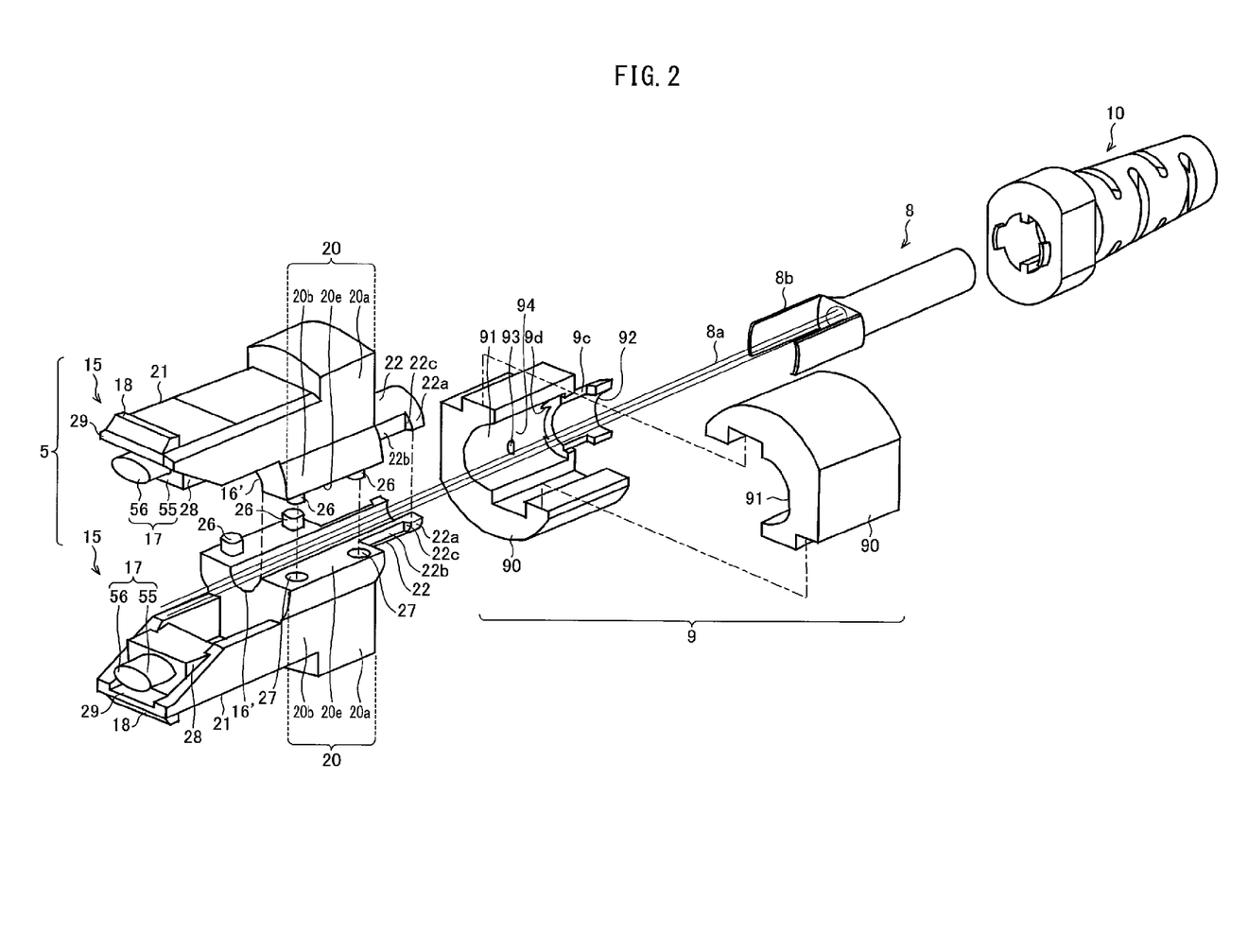
FIG. 2 is a partial exploded diagram of the optical connector illustrated in FIG. 1.
Figure 3:
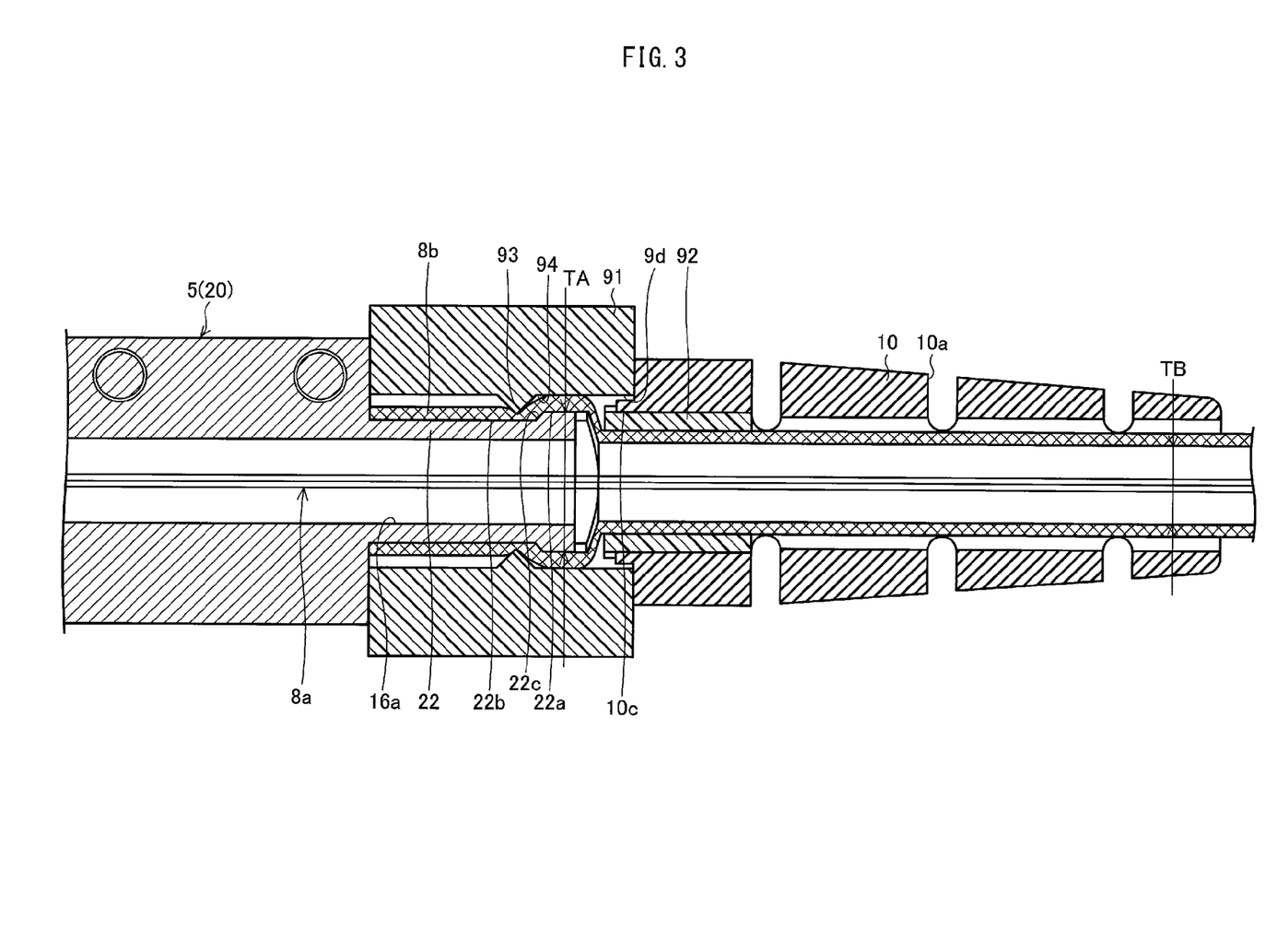
FIG. 3 is a partial cross-sectional diagram of the optical connector illustrated in FIG. 1.

FIG. 1 illustrates a configuration of an optical connector of the embodiment of the present invention. (a) of FIG. 1 is a planar diagram of the optical connector of the embodiment of the present invention. (b) of FIG. 1 is a cross-sectional diagram of (a) of FIG. 1. FIG. 2 is a partial exploded diagram of the optical connector illustrated in FIG. 1. FIG. 3 is a partial cross-sectional diagram of the optical connector illustrated in FIG. 1.

[1] Configuration of Optical Connector

An optical connector 1 of the present embodiment, illustrated in FIG. 1, is assembled at an end of a bare optical fiber protected by a protection tube of an optical fiber cord. The optical connector 1 substantially corresponds to an F13-type multi-core optical fiber connector defined by JIS C 5982, a so-called MPO connector. Note that the optical connector of the present invention is not limited to a multi-core optical fiber connector but is also applicable to a single-core optical fiber connector.

The optical connector 1 includes a connector housing 2 (housing), an optical ferrule 3 (ferrule), a coil spring 4, a spring push 5 (housing body, cylindrical structure), a coupling 6, a coupling spring 7, a fixing member 9, and a rubber boot 10 (boot).

The optical connector 1 is configured as follows. The connector housing 2 houses (i) the optical ferrule 3 to which an end part of an optical fiber which is being inserted into the optical ferrule 3 is fixed and in which the optical fiber is terminated and (ii) the coil spring 4 which gives force to move the optical ferrule 3 forward. The spring push 5 is provided on a back end side of the connector housing 2 so as to receive reactive force of the coil spring 4. The connector housing 2 has an outer circumference provided with the coupling 6 and the coupling sprig 7 which allow an adaptor (not illustrated) to be connected to or disconnected from the optical connector 1. The spring push 5 has a back part combined with (i) the fixing member 9 which fixes a connection part of an optical fiber cord 8 to the spring push 5 and (ii) the rubber boot 10 which protects a vicinity of the connection part of the optical fiber cord 8.

When the optical connector 1 is connected to the adaptor on a first side of the adaptor, the coupling 6 moves backward, and a concave engagement part 2c of the connector housing 2 engages with an engagement claw of the adaptor, so that the optical connector 1 is combined with the adaptor. The optical ferrule 3 of the optical connector 1 faces an optical ferrule of another optical connector connected to the adaptor on a second side opposite to the first side. The optical fiber of the optical connector 1 is optically connected to an optical fiber of the anther optical connector.

The above has described a basic structure of the optical connector 1 of the present embodiment. The following description will discuss each component of the optical connector 1.

<Optical Fiber Cord 8>

The optical fiber cord 8 includes (i) a bare optical fiber section 8a including a plurality of bare optical fibers (bare optical fiber) and (ii) a protection tube 8b which covers and protects an outer circumference of the bare optical fiber section 8a. The optical connector 1 of the present embodiment can be called an optical connector which is assembled at an end of bare optical fibers protected by a protection tube.

Each of the bare optical fibers of the bare optical fiber section 8a is a bare fiber (hereinafter referred to as an optical fiber) having been subjected to primary coating. The each of the bare optical fibers of the bare optical fiber section 8a has, for example, an external diameter of 0.25 mm.

The protection tube 8b is made of an elastic coating material having an elastic modulus of not less than 140%, preferably an elastic modulus of not less than 200%. One specific example of the protection tube 8b is a silicon tube. The protection tube 8b is not limited to the silicon tube but can be made of, e.g., a synthetic rubber, a natural rubber, nylon, Hytrel (Registered Trademark), a fluororesin (ETFE, TTFE), or Teflon (Registered Trademark).

As illustrated in (b) of FIG. 1, the bare optical fiber section 8a of the optical fiber cord 8 is covered with the protection tube 8b in a region where the optical fiber cord 8 is being inserted into the rubber boot 10. The protection tube 8b is separated from the bare optical fiber section 8a in a region where the optical fiber cord 8 is being inserted into the fixing member 9, specifically, on a side closer to the rubber boot 10 than an optical fiber combining section (cylindrical structure) of the spring push 5. In a through hole 16 of the spring push 5 into which through hole 16 an optical fiber is to be inserted, only the bare optical fiber section 8a is inserted. The protection tube 8b separated from the bare optical fiber section 8a covers an outer circumferential surface of the optical fiber combining section 22.

The plurality of bare optical fibers of the bare optical fiber section 8a are arranged in parallel to each other in a tape fiber shape in a region from the spring push 5 to the optical ferrule 3.

Note that (b) of FIG. 1, and FIGS. 2, 3 and 5 illustrate a case where the bare optical fiber section 8a includes three bare optical fibers. A bare optical fiber section 8a for practical use is a multi-core optical fiber having, e.g., 12×2=24 cores (including 24 bare optical fibers), or 12×4=48 cores (including 48 bare optical fibers).

<Optical Ferrule 3>

The optical ferrule 3 is a ferrule for use in a multi-core connector, i.e., a so-called MT (mechanically transferable) ferrule. The optical ferrule 3 is provided at a front end of the optical connector 1 (at an end of the optical connector 1 to which end an adaptor is connected). The optical ferrule 3 fixes an end part of an optical fiber which is inserted into the optical ferrule 3.

The optical fiber which is being inserted into the optical ferrule 3 is exposed from an end surface of the optical ferrule 3 to which end surface an adaptor is connected. The end surface is an optical connection end surface. The optical fiber may be bonded to the optical ferrule 3 with an adhesive.

The optical ferrule 3 has two pin holes 3a each extending from a front part of the optical ferrule 3 (the end surface of the optical ferrule 3 to which end surface an adaptor is connected) to a back part of the optical ferrule 3. As illustrated in (b) of FIG. 1, the two pin holes 3a are provided respectively above and below a region of the optical ferrule 3 so as to sandwich the region, into which region the optical fiber is inserted. In a case where the optical ferrule 3 is connected to another optical ferrule for use in a multi-core connector so that the optical ferrule 3 faces the another optical ferrule, position-determining guide pins held by a pink lamp combined with a back part of the another optical ferrule are inserted into the respective pin holes 3a.

The back part of the optical ferrule 3 is provided with a pin base 23. The position-determining guide pins inserted into the respective pin holes 3a come in contact with the pin base 23.

<Coil Spring 4>

The coil spring 4 is a spring which gives force to move the optical ferrule 3 in a direction in which an adaptor is connected. The coil spring 4 is provided between the spring push 5 and the pin base 23 with which the back part of the optical ferrule 3 is provided.

<Spring Push 5>

The spring push 5 is provided so as to face the optical ferrule 3 and the pin base 23 via the coil spring 4. The spring push 5 receives reactive force of the coil spring 4. The spring push 5 is made up of two half members 15 (see FIG. 2). The spring push 5 has a spring pushing structure (illustrated in (b) of FIG. 1) in which the two half members 15 come into contact with each other so as to face each other. Each of the two half members 15 has a semicircular concave part 16' (see FIG. 2) so that parts of the respective two half members 15 which parts come into contact with each other form a through hole 16 into which an optical fiber is to be inserted.

The spring push 5 is provided with a pair of spring receiving sections 17 which receive reactive force of the coil spring 4, the pair of spring receiving sections 17 facing the optical ferrule 3.

The spring push 5 has engagement claws 18 which engage with engagement holes 2a of the connector housing 2 (see (b) of FIG. 1). The engagement claws 18 are provided on respective external surfaces of end parts of a pair of arm sections 21 which (i) extend forward of a base section 20 of the spring push 5 and (ii) are provided on opposite sides in a width direction of the optical connector (on opposite upper and lower sides of (b) of FIG. 1). Each of the end parts of the pair of arm sections 21 is provided with a flat part 55 facing forward and a protrusion part 56 which protrudes forward in the vicinity of the center of the flat part 55. The pair of spring receiving sections 17 are made up of the flat parts 55 and the protrusion parts 56.

As illustrated in FIG. 2, each of the pair of arm sections 21 has, as a thick part 28 that thickens inward in the width direction of the optical connector, a part extending from a joint of the each of the pair of arm sections 21 on a base section 20 side to a corresponding one of the protrusion parts 56. The thick part 28 has an end part provided with a corresponding one of the flat parts 55. The engagement claws 18 provided on the end parts of the pair of arm sections are provided on respective external surfaces of thin parts 29 provided outside of the protrusion parts 56 of the pair of arm sections 21 in the width direction of the optical connector.

The base section 20 has a protrusion part 20a on opposite sides in the width direction of the optical connector (in a direction in which the pair of arm sections 21 face each other). The protrusion part 20a is housed by a stair-like diameter expansion part 2d provided in a back end part of the connector housing 2 (see (b) of FIG. 1). The protrusion part 20a engages with the stair-like diameter expansion part 2d, and the engagement claws 18 engage with the engagement holes 2a, so that the base section 20 is fixed to the back end side of the connector housing 2. The base section 20 has a center part 20b whose outer circumference is a curve surface.

The base section 20 has a back end provided with the optical fiber combining section 22, in a cylindrical shape, having a through hole coaxial with the through hole 16. Note that the through hole of the optical fiber combining section 22 will also be referred to as the through hole 16.

As has been described, the spring push 5 is made up of the two half members 15 which are assembled (see FIG. 2). In other word, each of the two half members 15 is provided with (i) a corresponding half of the base section 20, (ii) a corresponding half of the protrusion part 20a, (iii) a corresponding half of the center part 20b, (iv) a corresponding one of the pair of spring receiving sections 17, (v) a corresponding one of the pair of arm sections 21 which has a corresponding one of the engagement claws 18, and (vi) a corresponding half of the optical fiber combining section 22.

As illustrated in FIG. 2, the two half members 15 have respective contact surfaces 20e to be combined with each other when the two half members 15 come into contact with each other. Each of the contact surfaces 20e has one region where two engagement protrusions 26 are provided and the other region where two engagement holes 27 are provided, the one region and the other region sandwiching the semicircular concave part 16'. In a case where the two half members 15 face each other and come into contact with each other, the engagement protrusions 26 of one of the two half members 15 engage with the engagement holes 27 of the other of the two half members 15, so that the two half members 15 are combined with and fixed to each other. Note that the contact surfaces 20e may be further securely fixed to each other via an adhesive. In a case where the contact surfaces 20e do not have structural combining means such as the engagement protrusions 26 and the engagement holes 27 but are merely flat, the contact surfaces 20e may be combined with each other merely via an adhesive.

The half members 15 are, for example, resin molded products made of PBT (polybutylene terephthalate) etc.

The optical fiber combining section 22, in the cylindrical shape, has an outer circumferential surface covered with the protection tube 8b of the optical fiber cord 8 (see FIG. 3). The bare optical fiber section 8a is being inserted into an inner circumferential part (hereinafter also referred to as the through hole 16) of the optical fiber combining section 22 (see FIG. 3). In other word, the optical fiber combining section 22 is being provided between an outer circumferential surface of the bare optical fiber section 8a and an inner circumferential surface of the protection tube 8b.

Note that a diameter of the through hole 16, i.e., an internal diameter of the optical fiber combining section 22 is constant in a case where the outer circumferential surface of the optical fiber combining section 22 is not covered with the protection tube 8b, in a case where the outer circumferential surface of the optical fiber combining section 22 is covered with the protection tube 8b, and in a case where the fixing member 9 covers the protection tube 8b present on the outer circumferential surface of the optical fiber combining section 22 and is partially applying pressure to the protection tube 8b toward the optical fiber combining section 22. Therefore, no pressure is applied to the bare optical fiber section 8a which is being inserted into the through hole 16, and the bare optical fiber section 8a is neither deformed nor broken due to applied pressure.

The diameter of the through hole 16, i.e., the internal diameter of the optical fiber combining section 22 may not be necessarily constant. However, the through hole 16 should always have a diameter which does not cause pressure to be applied to the bare optical fiber section 8a which is being inserted into the through hole 16. The through hole 16 is not allowed to slightly reduce in diameter, for example, in the case where the outer circumferential surface of the optical fiber combining section 22 is covered with the protection tube 8b, or in the case where the fixing member 9 covers the protection tube 8b present on the outer circumferential surface of the optical fiber combining section 22 and applies pressure to the protection tube 8b toward the optical fiber combining section 22. Even in the case, the through hole 16 should have the diameter which does not cause pressure to be applied to the bare optical fiber section 8a which is being inserted into the through hole 16.

On a back end side of the outer circumferential surface of the optical fiber combining section 22 provided is a stair part 22a (FIGS. 2 and 3) which (i) comes into contact with the inner circumferential surface of the protection tube 8b which covers the outer circumferential surface of the optical fiber combining section 22 and (ii) makes it difficult for the protection tube 8b to come off from the outer circumferential surface of the optical fiber combining section 22. By bending the protection tube 8b, the stair part 22a contributes to increase in friction resistance of the protection tube 8b to the outer circumferential surface of the optical fiber combining section 22. It is possible to form the stair part 22a so as to be adjacent to a cut part of the optical fiber combining section 22 by partially cutting the optical fiber combining section 22 from an outer circumferential surface side of the optical fiber combining section 22 so as to reduce a thickness of the optical fiber combining section 22 in the cylindrical shape. According to the present embodiment, the cut part, which is formed on a front end side of the outer circumferential surface of the optical fiber combining section 22, is a flat surface 22b.

An inclined surface 22a is formed between the flat surface 22b and the stair part 22a so as to prevent the protection tube 8b which covers the outer circumferential surface of the optical fiber combining section 22 from being torn or broken due to a step (particularly, a corner portion of the step) present between the stair part 22a and the flat surface 22b. The corner portion of the stair part 22a has an obtuse angle so as not to damage the protection tube 8b. The inclined surface 22c is preferably at an angle of not less than 45° and less than 90° to the flat surface 22b. Note that the inclined surface 22c may be curved. As illustrated in FIG. 3, the stair part 22a has the corner portion on a boundary between a plurality of surfaces of the stair part 22a. Alternatively, the stair part may have a round shape without any corner portion, or may have a groove on an outer circumferential surface of the stair part.

An external diameter ("TA" in FIG. 3) of the outer circumferential surface of the optical fiber combining section 22, at a location where the stair part 22a is formed, is larger than an internal diameter ("TB" in FIG. 3) of the protection tube to which no external force is being applied. This allows the protection tube 8b which covers the stair part 22a to expand in a diameter expansion direction, thereby increasing friction resistance to the outer circumferential surface of the optical fiber combining section 22. This consequently makes it further difficult for the protection tube 8b to come off from the outer circumferential surface.

Note that a method of forming the stair part 22a is not limited to the above-described method of partially cutting the optical fiber combining section 22. The object of providing the stair part 22a is as follows. The protection tube 8b is stretched on the stair part 22a so as to cause friction resistance to the outer circumferential surface of the optical fiber combining section 22. The friction resistance causes the protection tube 8b to stay on the outer circumferential surface, thereby making it difficult for the bare optical fiber section 8a to come off. The method of forming the stair part 22a is not limited to the method of partially cutting the optical fiber combining section 22 provided that the object is attained. For example, a protrusion part may be provided on the back end side of the outer circumferential surface of the optical fiber combining section 22 so as to protrude in a direction in which the external diameter of the optical fiber combining section 22 increases from the front end side to the back end side of the outer circumferential surface of the optical fiber combining section 22.

The protection tube 8b which covers the stair part 22a is bent and deformed to increase friction resistance to the outer circumferential surface of the optical fiber combining section 22. This makes it difficult for the protection tube 8b to come off from the outer circumferential surface of the optical fiber combining section 22.

The outer circumferential surface of the optical fiber combining section 22 may further have a protrusion part which protrudes toward the inner circumferential surface of the protection tube 8b, the protrusion part coming into contact with the inner circumferential surface of the protection tube 8b which covers the outer circumferential surface of the optical fiber combining section 22 and applying pressure to the protection tube 8b toward an inner circumferential wall of a pressing section 91.

<Fixing Member 9>

The fixing member 9 is made up of two half sprit members 90 (a plurality of divisional members) engaged with each other (see FIG. 2). The two half sprit members 90 are provided so as to enclose the outer circumferential surface of the optical fiber combining section 22. The two half sprit members 90 are engaged with each other, so that the fixing member 9 including the pressing section 91 and a rubber boot combining section 92 (later described) is realized. That is, each of the two half sprit members 90 includes a corresponding half of the pressing section 91 (later described) and a corresponding half of the rubber boot combining section 92 (later described). The two half sprit members 90 engaged with each other so that the fixing member 9 is combined with the optical fiber combining section 22 are rigid enough to keep a state where a protrusion section 93 (later described) is applying pressure to the protection tube 8b to deform the protection tube 8b. The fixing member 9 will be described below.

The fixing member 9 includes the pressing section 91 provided so as to cover the optical fiber combining section 22 (see (b) of FIG. 1).

The pressing section 91 has the inner circumferential wall (inner wall surface) which constitutes a circle substantially concentric with that constituted by the optical fiber combining section 22 in the cylindrical shape. The inner circumferential wall covers the protection tube 8b which covers the outer circumferential surface of the optical fiber combining section 22.

According to the present embodiment, the inner circumferential wall of the pressing section 91 has the protrusion section 93 protruding in a diameter reduction direction (see FIG. 3). The protrusion section 93 is provided for each of the two half sprit members 90. The outer circumferential surface of the optical fiber combining section 22 has the stair part 22a and the flat surface 22b (as early described). The stair part 22a and the flat surface 22b are covered with the protection tube 8b. The protrusion section 93 of the inner circumferential wall of the pressing section 91 is provided so as to face the flat surface 22b. The protrusion section 93 applies pressure, toward the flat surface 22b, to the protection tube 8b between the protrusion section 93 and the flat surface 22b. The protection tube 8b to which the protrusion section 93 applies pressure is deformed and thinned between the protrusion section 93 and the flat surface 22b.

Note that "thickness of the protection tube 8b" described in the specification of the present application is a layer thickness of the protection tube 8b. Note also that a diameter of the optical fiber cord 8 equals to addition of a diameter of the bare optical fiber section 8a to twice as thick as the thickness of the protection tube 8a.

The protrusion section 93 protrudes so that (i) a first distance between the flat surface 22b and a protrusion end part of the protrusion section 93 is smaller than a second distance between the flat surface 22b and a region, other than the protrusion section 93, of the inner circumferential wall of the pressing section 91 and (ii) the protection tube 8b is not broken due to pressure applied by the protrusion section 93. Such determination of the first distance makes it possible to simply and securely combine the protection tube 8b with the outer circumferential surface of the optical fiber combining section 22, as compared to a configuration where the protection tube 8b is crimped by a metallic crimping section. The metallic crimping section needs external force to reduce its diameter. The external force is not easily adjusted. In a case where the crimping section crimps the tube too much, the crimping section cuts into the tube and probably damages the tube. In a case where the crimping section crimps the tube too weakly, the crimping section fails to fix the tube. On the other hand, the inner circumferential surface of the pressing section 91 and the protrusion section 93 need only to be configured so that the protrusion section 93 protrudes as above. The protection tube 8 can be simply and securely fixed.

According to the present embodiment, the protrusion section 93 has a triangular cross section (see FIG. 3). A cross-sectional shape of the protrusion section 93 is not limited to the triangular cross section provided that the protrusion section 93 can apply pressure to the protection tube 8b.

Further, according to the present embodiment, in a region of the inner circumferential wall of the pressing section 91 which region is closer to a front end of the inner circumferential wall than the protrusion section 93, the protrusion section 93 does not apply pressure, toward the flat surface 22b, to the protection tube 8b between the pressing section 91 and the flat surface 22b of the optical fiber combining section 22.

As such, the protrusion section 93 applies external pressure, toward the optical fiber combining section 22, to the protection tube 8b which covers the outer circumferential surface of the optical fiber combining section 22 so as to deform the protection tube 8b. This brings about an effect that the protection tube 8b is securely combined with (fixed to) the optical fiber combining section 22.

According to the present embodiment, the protrusion section 93 is partially provided along a circumferential direction (see FIG. 2). The protrusion section 93 may be provided so as to make a circle along the circumferential direction. Further, according to the present embodiment, only one protrusion section 93 is provided in a longitudinal direction of an optical fiber. Alternatively, a plurality of protrusion sections 93 may be provided in the longitudinal direction.

Note here that part of a ridge line of the protrusion section 93 is parallel to the flat surface 22b of the outer circumferential surface of the optical fiber combining section 22. This allows the protrusion section 93 to apply a uniform pressure to the protection tube 8b toward the flat surface 22b.

According to the present embodiment, the protection tube 8b having a cylindrical shape, as it is, does not cover the outer circumferential surface of the optical fiber combining section 22, but two portions of the protection tube 8b in the cylindrical shape (see FIG. 2) cover the outer circumferential surface of the optical fiber combining section 22, the two portions being obtained by partially cutting the protection tube 8b in a longitudinal direction of the optical fiber cord. However, the protection tube 8b, of the present invention, which covers the outer circumferential surface of the optical fiber combining section 22 does not necessarily have the two portions (see FIG. 2). The following Modification (1) or (2) is applicable.

Modification (1)

A cylindrical protection tube 8b is cleaved so that a cleavage extends in a longitudinal direction of an optical fiber cord. The cleavage of the protection tube 8b covers the outer circumferential surface of the optical fiber combining section 22.

Modification (2)

A cylindrical protection tube 8b which is neither cut nor cleaved covers the outer circumferential surface of the optical fiber combining section 22 as it is. The protection tube 8b of the present invention is made of an elastic material. Therefore, even the protection tube 8b which is neither cut nor cleaved can cover the outer circumferential surface of the optical fiber combining section 22. Even in a case where the optical fiber combining section 22 has an external diameter larger than an internal diameter of the protection tube 8b which is neither cut nor cleaved, the protection tube 8b which is neither cut nor cleaved externally tightens the optical fiber combining section 22 thanks to elasticity of the protection tube 8b to stay on the outer circumferential surface of the optical fiber combining section 22. The elasticity contributes to fixing the protection tube 8b to the outer circumferential surface of the optical fiber combining section 22.

The above has described Modifications (1) and (2).

As such, according to the present embodiment, only part of the inner circumferential wall of the pressing section 91 (i.e., the protrusion section 93) applies pressure, toward the outer circumferential surface of the optical fiber combining section 22, to the protection tube 8b which covers the outer circumferential surface of the optical fiber combining section 22. The present invention, however, is not limited to this, but may have, for example, the following configuration.

For example, the whole inner circumferential wall of the pressing section 91, i.e., the protrusion section 93 and the region of the inner circumferential wall of the pressing section 91 which region is closer to the front end of the inner circumferential wall than the protrusion section 93 may apply pressure to the protection tube 8b toward the outer circumferential surface of the optical fiber combining section 22. In this case, an internal diameter of the inner circumferential wall of the pressing section 91 (which is smallest at the protrusion section 93 and largest in the region of the inner circumferential wall of the pressing section 91 which region is closer to the front end of the inner circumferential wall than the protrusion section 93) is determined so that a space between the inner circumferential wall and the outer circumferential surface of the optical fiber combining section 22 is smaller (thinner) than the thickness of the protection tube 8b which covers the outer circumferential surface of the optical fiber combining section 22. Under this determination, when the two half sprit members 90 are engaged with each other so as to cover the protection tube 8b which covers the optical fiber combining section 22, the whole inner circumferential wall of the pressing section 91 elastically deforms the protection tube 8b, and presses the protection tube 8b to the optical fiber combining section 22, so that the protection tube 8b is fixed.

The fixing member 9 includes a rubber boot combining section 92 provided backward of the pressing section 91 (on a rubber boot side), with which rubber boot combining section 92 the rubber boot 10 is to be combined.

The rubber boot combining section 92 has an external diameter slightly larger than an internal diameter of the rubber boot 10. The rubber boot 10 combined with the rubber boot combining section 92 elastically deforms to increase an inner circumference in a diameter direction, and tightens the rubber boot combining section 92 due to restoring force of the rubber boot 10.

The external diameter of the rubber boot combining section 92 is smaller than an external diameter of the pressing section 91. The fixing member 9 has a concave part in the vicinity of a boundary between the pressing section 91 and the rubber boot combining section 92, the concave part housing a protrusion part of the rubber boot 10. The concave part will be described below with reference to FIG. 4.

Figure 4:
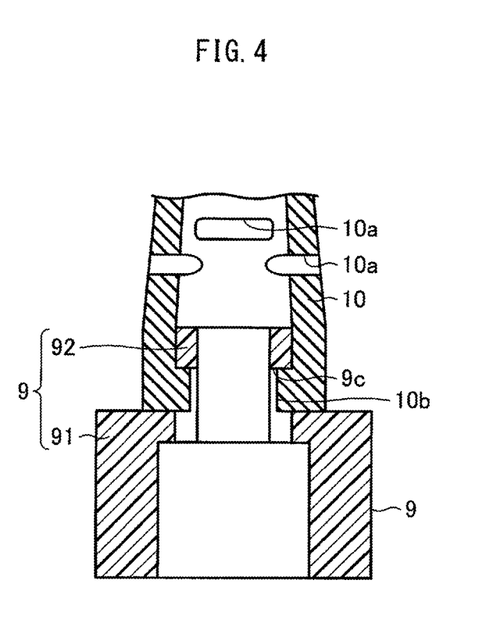
FIG. 4 is a planar cross-sectional diagram of part of the optical connector illustrated in FIG. 1.

FIG. 4 is a diagram illustrating a state where the fixing member 9 is combined with the rubber boot 10. Specifically, FIG. 4 illustrates a cross-sectional diagram of the state, the cross-sectional diagram being perpendicular to the cross-sectional diagram of FIG. 3.

As illustrated in FIG. 4, the rubber boot combining section 92 has first concave parts 9c (position determining parts) in the vicinity of the pressing section 91. Each of the first concave parts 9c extends in a direction of a center axis of the rubber boot combining section 92, and penetrates the rubber boot combining section 92 from outside of the rubber boot combining section 92 toward part of the rubber boot combining section 92 into which part the optical fiber cord is inserted. The first concave parts 9c are provided so as to face each other via the center axis of the rubber boot combining section 92. Note that the center axis of the rubber boot combining section 92 substantially equals to that of the optical fiber cord 8. The rubber boot 10 has first protrusion parts 10b (position determining parts) each of which protrudes in a diameter reduction direction and fits in a corresponding one of the first concave parts 9c from outside of the rubber boot combining section 92. When the first protrusion parts 10b are housed (fitted) in the respective first concave parts 9c, restriction is placed on movement of the rubber boot 10 in the direction of the center axis, and the rubber boot 10 is unlikely to come off from the fixing member 9. Note that the first concave parts 9c may penetrate the rubber boot combining section 92.

As illustrated in FIG. 3, second concave parts 9d (position determining parts) are further provided between the rubber boot combining section 92 and the pressing section 91 so as to face each other via the center axis of the rubber boot combining section 92. The second concave parts 9d make a right angle with the first concave parts 9c with respect to the center axis. Each of the second concave parts 9d has an arc shape along an outer circumference of the optical fiber cord 8 to be inserted. The rubber boot 10 has second protrusion parts 10c (position determining parts) each of which protrudes from an end surface of the rubber boot 10 which end surface faces the fixing member 9 toward the spring push 5. Each of the second protrusion parts 10c has an arc shape along the outer circumference of the optical fiber cord 8 so as to be fitted in a corresponding one of the second concave parts 9d. When the second protrusion parts 10c are housed (fitted) in the respective second concave parts 9d, it is possible to prevent the rubber boot 10 from rotating about the center axis of the rubber boot combining section 92. Note that, according to the present embodiment, the protrusion parts of the rubber boot 10 are fitted in the respective concave parts of the fixing member 9. The present invention, however, is not limited to this. The rubber boot 10 may have the concave parts, whereas the fixing member 9 may have the protrusion parts. In this case, the protrusion parts of the fixing member 9 are fitted in the respective concave parts of the rubber boot 10.

The fixing member 9 can be made of a rigid material. Note that "rigid" means that an internal diameter defined by the inner circumferential wall of the pressing section 91 is not reduced due to deformation of the fixing member 9 itself. For example, a resin molded product can be employed as the fixing member 9. The fixing member 9 may alternatively be made of metal.

According to the present embodiment, the fixing member 9 is made up of the two half sprit members 90. The fixing member 9 may alternatively be made up of three or more divisional members.

<Rubber Boot 10>

The rubber boot 10 has thin long holes 10a each extending in the circumferential direction. This allows the rubber boot 10 to flexibly bend. The rubber boot 10 may be a typical rubber boot. Alternatively, the rubber boots 10 may be thinner than the typical rubber boot.

Note that the rubber boot is not an essential component of the optical connector of the present invention.

[2] Assembling of Optical Connector

Figure 5:
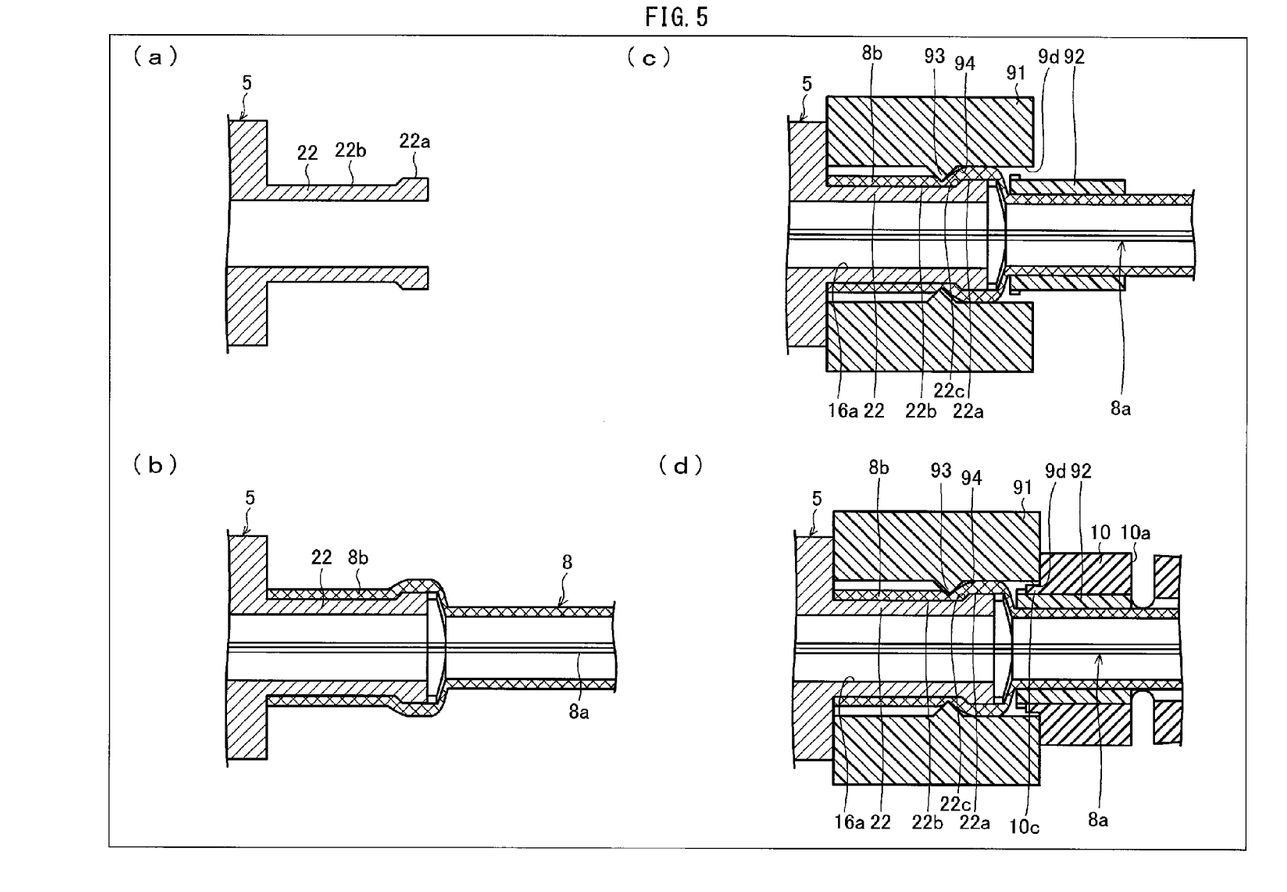
FIG. 5 is a partial cross-sectional diagram illustrating an assembling procedure of the optical connector illustrated in FIG. 1.

In order to assemble an optical connector 1 of the present embodiment, first, two half members 15 are combined with each other so that a spring push 5 is formed (see (a) of FIG. 5).

A predetermined length of a protection tube 8b of an optical fiber cord 8 is removed from an end of the protection tube 8b so that a bare optical fiber section 8a of the optical fiber cord 8 is exposed. A remaining end of the protection tube 8b is cut, for example, as illustrated in FIG. 2. The exposed bare optical fiber section 8a is inserted into a through hole 16 of the spring push 5 into which through hole an optical fiber is to be inserted. The protection tube 8b covers an outer circumferential surface of an optical fiber combining section 22 (see (a) of FIG. 5).

Then, the protection tube 8b which covers the outer circumferential surface of the optical fiber combining section 22 is combined with a fixing member 9 by assembling two half sprit members 90 so that halves of an inner circumferential wall of a pressing section 91 of the respective two half sprit members 90 face each other (see (c) of FIG. 5). As illustrated in FIG. 2, the two half sprit members 90 have respective convexoconcave parts which fit in each other when the two half sprit members 90 are assembled. By fitting one of the convexoconcave parts in the other of the convexoconcave parts, the fixing member 9 can be easily formed. By assembling the two half sprit members 90, the above-described pressure is applied to the protection tune 8*b* which covers the outer circumferential surface of the optical fiber combining section 22.

Then, the fixing member 9 is combined with a rubber boot 10 (see (d) of FIG. 5). Note that the rubber boot 10 should be combined with the optical fiber cord 8 in advance before the bare optical fiber section 8*a* is inserted into the through hole 16 of the spring push 5.

The bare optical fiber section 8*a* may be inserted into an optical ferrule 3 and a pin base 23 provided backward of the optical ferrule 3 after the fixing member 9 is combined with the rubber boot 10 as illustrated in (d) of FIG. 5. Alternatively, the bare optical fiber section 8*a* may be inserted into and fixed to the optical ferrule 3 and the pin base 23 before the spring push 5, the fixing member 9, and the rubber boot 10 are provided in this order.

In a case where the bare optical fiber section 8*a* is inserted into and fixed to the optical ferrule 3 and the pin base 23 before the spring push 5 is provided, the optical connector 1 is assembled according to the following modification of an assembling procedure.

(Modification of Assembling Procedure)

Similar to the above, the predetermined length of the protection tube 8*b* of the optical fiber cord 8 is removed from the end of the protection tube 8*b* so that the bare optical fiber section 8*a* of the optical fiber cord 8 is exposed. The remaining end of the protection tube 8*b* may be cut, for example, as illustrated in FIG. 2 (i) in a step of exposing the bare optical fiber section 8*a* or (ii) immediately before the protection tube 8*b* covers the outer circumferential surface of the optical fiber combining section 22.

The exposed bare optical fiber section 8*a* is inserted into the pin base 23. Then, an end part of the exposed bare optical fiber section 8*a* is inserted into the optical ferrule 3 illustrated in FIG. 1. A front end surface of the optical ferrule 3 is terminated. Thereafter, the bare optical fiber section 8*a* is fixed to the optical ferrule 3. A plurality of optical fibers of the bare optical fiber section 8*a* extending backward of the optical ferrule 3 have a tape shape so that a tape fiber is formed. A position of the pin base 23 is determined with respect to the tape fiber. Then, the optical ferrule 3 is fitted in the pin base 23 so that the optical ferrule 3 is fixed to the pin base 23.

Thereafter, the bare optical fiber section 8*a* extending backward of the pin base 23 is inserted into the spring push 5. In and after a step of inserting the bare optical fiber section 8*a* into the spring push 5 is the same as above. The modification of the assembling procedure is as above.

[3] Modification 1 of Optical Connector

Figure 6:
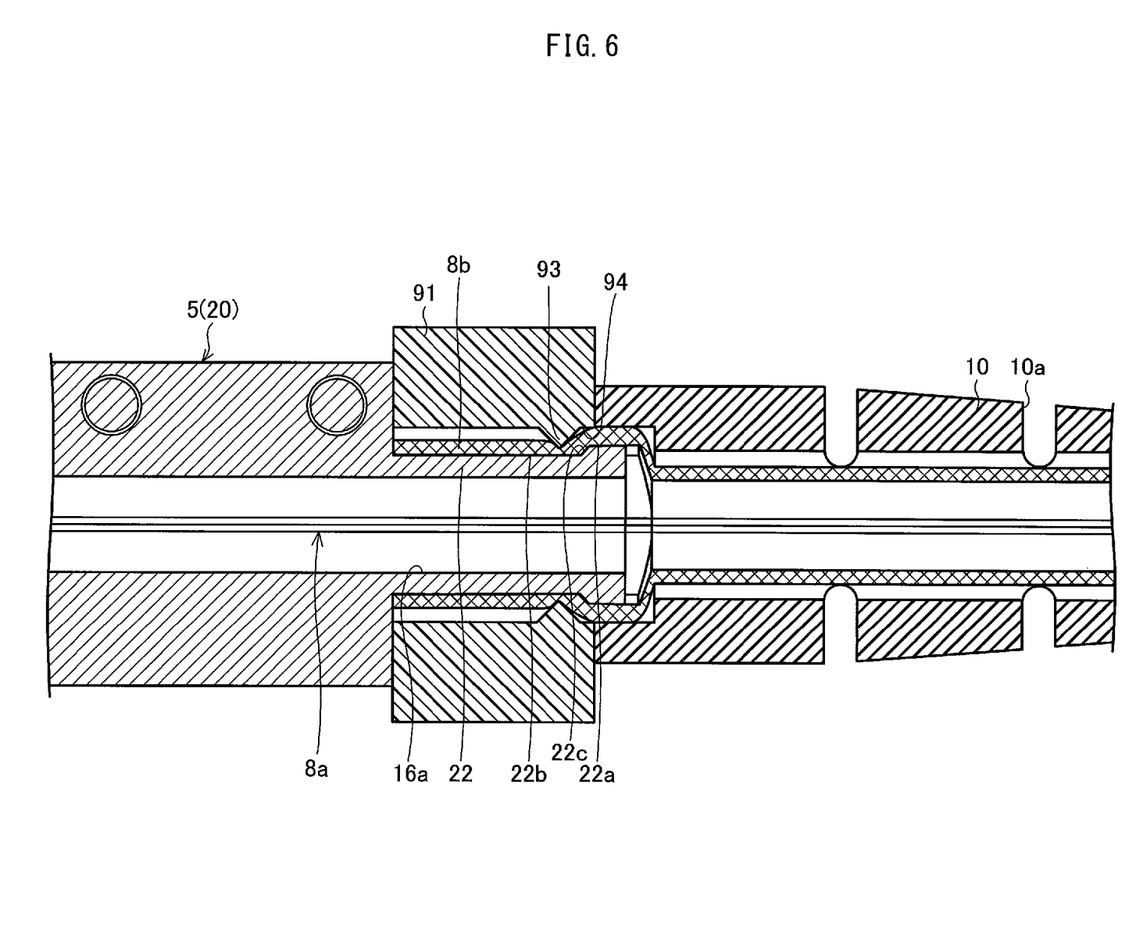
FIG. 6 is a partial cross-sectional diagram illustrating a modification of the optical connector illustrated in FIG. 1.

The following description will discuss a modification of the optical connector 1 with reference to FIG. 6. FIG. 6 is a partial cross-sectional diagram illustrating the modification of the optical connector 1. FIG. 6 corresponds to FIG. 3. Note that Modification 1 will describe a difference from the above embodiment. Therefore, for convenience, identical reference numerals are given to members having respective functions identical to those described in the above embodiment, and descriptions of those members are omitted in Modification 1.

An optical connector 1' illustrated in FIG. 6 is different from that of the embodiment in that (i) an optical fiber combining section 22' (cylindrical structure) of a spring push 5' of the optical connector 1' also serves as a rubber boot combining section and (ii) a rubber boot 10 does not cover a fixing member 9'.

The optical connector 1' illustrated in FIG. 6 is configured so that (i) a protection tube 8*b* covers an outer circumferential surface of the optical fiber combining section 22', (ii) the fixing member 9' applies pressure, toward a flat surface 22*b* of the optical fiber combining section 22', to part of the protection tube 8*b* which part covers the flat surface 22*b*, and (iii) part of the protection tube 8*b* which part covers a stair part 22*a* is covered with an inner circumference of the rubber boot 10.

[4] Modification 2 of Optical Connector

As illustrated in FIG. 3, the optical connector 1 of the embodiment is configured so that (i) the outer circumferential surface of the optical fiber combining section 22 has the stair part 22*a* which bends the protection tube 8*b* to cause resistance against pulling out of the protection tube 8*b*, and (ii) the stair part 22*a* is provided in the vicinity of a back side of the protrusion section 93 of the pressing section 91 of the fixing member 9 which protrusion section 93 applies pressure to the protection tube 8*b* to deform the protection tube 8*b*. This configuration keeps a state where the protection tube 8*b* is being bent by the stair part 22*a* and the protrusion section 93. However, the present invention is not limited to this configuration. For example, the inner circumferential wall of the pressing section 91 of the fixing member 9 may have the stair part which bends the protection tube 8*b* to cause resistance against pulling out of the protection tube 8*b*. In this case, the outer circumferential surface of the optical fiber combining section 22 has the protrusion section which applies pressure to the protection tube 8*b* to deform the protection tube 8*b*. The protrusion section of the outer circumferential surface of the optical fiber combining section 22 applies pressure to the protection tube 8*b* toward the inner circumferential wall of the pressing section 91 of the fixing member 9.

Note that Modification 2 is suitably applicable to a case where the internal diameter of the protection tube to which no external force is being applied is larger than the external diameter of the optical fiber combining section 22.

[SUMMARY]

In order to attain the object, an optical connector of the present invention is configured to be an optical connector assembled at an end of a bare optical fiber protected by a protection tube, including: a cylindrical structure (i) which is provided on a back end side of a housing body of the optical connector which housing body houses a ferrule, (ii) into which the bare optical fiber which extends from the ferrule is inserted, and (iii) which has an outer circumferential surface to which the protection tube is fixed; and a fixing member which is combined with the cylindrical structure so that the protection tube is sandwiched between the outer circumferential surface of the cylindrical structure and an inner wall surface of the fixing member, one of the outer circumferential surface of the cylindrical structure and the inner wall surface of the fixing member having a protrusion section which applies pressure to the protection tube to deform the protection tube so that the protection tube is fixed to the cylindrical structure, whereas the other of the outer circumferential surface of the cylindrical structure and the inner wall surface of the fixing member having a stair part in a vicinity of a back side of the protrusion section, the stair part bending the protection tube to cause resistance against pulling out of the protection tube.

According to the configuration, the protrusion section and the stair part bend the protection tube provided on the outer circumferential surface of the cylindrical structure so that friction resistance to the outer circumferential surface of the cylindrical structure increases. Therefore, the protection tube is stayed on the outer circumferential surface of the cylindrical structure, and the bare optical fiber is unlikely to come off from the cylindrical structure. It is possible to provide an optical connector having a high reliability that that an optical fiber cord is unlikely to come off from the optical connector as compared to a conventional configuration where a fibrous tension-resistance member that constitutes an optical fiber cord is crimped.

Further, according to the configuration, the protection tube is deformed between the fixing member and the outer circumferential surface of the cylindrical structure. Therefore, no external force is applied to the bare optical fiber which is being inserted into a through hole of the cylindrical structure. That is, the through hole of the cylindrical structure secures a space where the bare optical fiber is inserted. It is therefore possible to provide a multi-core optical fiber in the space. As such, the optical connector of the present invention is a general-purpose optical connector applicable to not only a single-core optical fiber connector but also the multi-core optical fiber connector.

The optical connector of the present invention is further configured so that a spring push which constitutes the housing body has the cylindrical structure.

The optical connector of the present invention is further configured so that the fixing member is made up of a plurality of divisional members which are assembled to enclose the cylindrical structure, and the plurality of divisional members which are combined with the cylindrical structure as the fixing member are rigid enough to keep a state where the protrusion section applies pressure to the protection tube to deform the protection tube.

Further, according to the configuration, the fixing member is made up of the plurality of assembled divisional members. Therefore, it is unnecessary to insert the bare optical fiber into the fixing member before inserting and fixing the bare optical fiber into/to the ferrule (as early described). The fixing member can be easily provided in a case where the optical connector is assembled.

It is preferable to further configure the optical connector of the present invention so that the protection tube has an elastic modulus of not less than 140%.

According to the configuration, the protection tube easily deforms, and easily causes friction against (i) the outer circumferential surface of the cylindrical structure and (ii) a surface of the fixing member, the surface facing the protection tube and having the protrusion section and a concave part.

Specifically, the protection tube is a silicon tube.

The optical connector of the present invention can be further configured so that the cylindrical structure has an external diameter larger than an internal diameter of the protection tube to which no external force is being applied.

According to the configuration, the protection tube which covers the outer circumferential surface of the cylindrical structure expands in a diameter expansion direction to increase friction resistance to the outer circumferential surface of the cylindrical structure. This makes it further difficult for the protection tube to come off from the outer circumferential surface of the cylindrical structure.

The optical connector of the present invention is further configured so that the one of the outer circumferential surface of the cylindrical structure and the inner wall surface of the fixing member has a flat surface in front of the stair part, and the fixing member is combined with the cylindrical structure so that the flat surface is parallel to part of a ridge line of the protrusion section.

The optical connector of the present invention is further configured so that the fixing member has a boot combining section with which a boot is to be combined.

According to the configuration, the fixing member not only fixes the protection tube to the outer circumferential surface of the cylindrical structure but also serves as a boot combining member. It is therefore unnecessary to provide a separate boot combining member, and possible to reduce the number of components.

The optical connector of the present invention is further configured so that the boot combining section and the boot have respective position determining parts which prevent the boot from being displaced with respect to the boot combining section.

A method of preventing a protection tube from coming off from an optical connector, of the present invention, is configured to be a method of preventing a protection tube from coming off from the optical connector, the method including the steps of: covering, with the protection tube, an outer circumferential surface of a cylindrical structure (i) which is provided on a back end side of a housing body of the optical connector which housing body houses a ferrule and (ii) into which a bare optical fiber which extends from the ferrule is inserted; combining the cylindrical structure with a fixing member so that the protection tube is sandwiched between the outer circumferential surface of the cylindrical structure and an inner wall surface of the fixing member, the other of the outer circumferential surface of the cylindrical structure and the inner wall surface of the fixing member having a protrusion section, whereas one of the outer circumferential surface of the cylindrical structure and the inner wall surface of the fixing member having a stair part in a vicinity of a back side of the protrusion section; and fixing the protection tube to the cylindrical structure by (i) causing the stair part to bend the protection tube and (ii) causing the protrusion section to apply pressure to the protection tube to deform the protection tube.

According to the configuration, as has been described above, it is possible to provide an optical connector having a high reliability that an optical fiber cord is unlikely to come off from the optical connector.

The present invention is not limited to the description of the above embodiment above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

An optical connector of the present invention is suitably applicable to a single-core optical fiber connector and a multi-core optical fiber connector.

REFERENCE SIGNS LIST 1, 1': Optical connector
2: Connector housing
2a: Engagement hole
2c: Concave engagement part
2d: Stair-like diameter expansion part
3: Optical ferrule (ferrule)
3a: Pin hole
4: Coil spring
5, 5': Spring push (housing body, cylindrical structure)
6: Coupling
7: Coupling spring
8: Optical fiber cord
8a: Bare optical fiber section
8b: Protection tube 9, 9': Fixing member
9c: First concave part (position determining part)
9d: Second concave part (position determining part)
10: Rubber boot
10a: Long hole
10b: First protrusion part (position determining part)
10c: Second protrusion part (position determining part)
15: Half member
16: Through hole into which optical fiber is to be inserted
16': Semicircular concave part
18: Engagement claw
20: Base section
20a: Protrusion part
20b: Center part
20e: Contact surface
21: Arm section
22, 22': Optical fiber combining section (cylindrical structure)
22a: Stair part (protrusion part)
22b: Flat surface
22c: Inclined surface
23: Pin base
26: Engagement protrusion
27: Engagement hole
28: Thick part
29: Thin part
55: Flat part
56: Protrusion part
90: Half sprit member (divisional member)
91: Pressing section
92: Rubber boot combining section
93: Protrusion section (stair section)

The invention claimed is:

1. An optical connector assembled at an end of a bare optical fiber protected by a protection tube, comprising:
    a cylindrical structure (i) which is provided on a back end side of a housing body of the optical connector which housing body houses a ferrule, (ii) into which the bare optical fiber which extends from the ferrule is inserted, and (iii) which has an outer circumferential surface to which the protection tube is fixed; and
    a fixing member which is combined with the cylindrical structure so that the protection tube is sandwiched between the outer circumferential surface of the cylindrical structure and an inner wall surface of the fixing member,
    one of the outer circumferential surface of the cylindrical structure and the inner wall surface of the fixing member having a protrusion section which applies pressure to the protection tube to deform the protection tube so that the protection tube is fixed to the cylindrical structure, whereas the other of the outer circumferential surface of the cylindrical structure and the inner wall surface of the fixing member having a stair part in a vicinity of a back side of the protrusion section, the stair part having a back portion having only an inclined surface which inclines in a direction opposite to a direction in which the protrusion section protrudes, and
    the protection tube which is in contact with the stair part being bent in the direction opposite to the direction in which the protrusion section protrudes so as to be stepped, so that resistance against pulling out of the protection tube is caused.

2. The optical connector as set forth in claim 1, wherein a spring push which constitutes the housing body has the cylindrical structure.

3. The optical connector as set forth in claim 1, wherein
    the fixing member is made up of a plurality of divisional members which are assembled to enclose the cylindrical structure, and
    the plurality of divisional members which are combined with the cylindrical structure as the fixing member are rigid enough to keep a state where the protrusion section applies pressure to the protection tube to deform the protection tube.

4. The optical connector as set forth in claim 1, wherein the protection tube has an elastic modulus of not less than 140%.

5. The optical connector as set forth in claim 1, wherein the protection tube is a silicon tube.

6. The optical connector as set forth in claim 1, wherein the cylindrical structure has an external diameter larger than an internal diameter of the protection tube to which no external force is being applied.

7. The optical connector as set forth in claim 1, wherein the one of the outer circumferential surface of the cylindrical structure and the inner wall surface of the fixing member has a flat surface in front of the stair part, and
    the fixing member is combined with the cylindrical structure so that the flat surface is parallel to part of a ridge line of the protrusion section.

8. The optical connector as set forth in claim 1, wherein the fixing member has a boot combining section with which a boot is to be combined.

9. The optical connector as set forth in claim 8, wherein the boot combining section and the boot have respective position determining parts which prevent the boot from being displaced with respect to the boot combining section.

10. A method of preventing a protection tube from coming off from an optical connector recited in claim 1,
    the method comprising the steps of:
    covering, with the protection tube, an outer circumferential surface of a cylindrical structure (i) which is provided on a back end side of a housing body of the optical connector which housing body houses a ferrule and (ii) into which a bare optical fiber which extends from the ferrule is inserted;
    combining the cylindrical structure with a fixing member so that the protection tube is sandwiched between the outer circumferential surface of the cylindrical structure and an inner wall surface of the fixing member, one of the outer circumferential surface of the cylindrical structure and the inner wall surface of the fixing member having a protrusion section, whereas the other of the outer circumferential surface of the cylindrical structure and the inner wall surface of the fixing member having a stair part in a vicinity of a back side of the protrusion section; and
    fixing the protection tube to the cylindrical structure by (i) causing the stair part to bend, in a direction opposite to a direction in which the protrusion section protrudes, the protection tube which is in contact with the stair part so that the protection tube is stepped and (ii) causing the protrusion section to apply pressure to the protection tube to deform the protection tube.

* * * * *